(12) United States Patent
Sano et al.

(10) Patent No.: US 9,858,454 B2
(45) Date of Patent: *Jan. 2, 2018

(54) METHOD AND A RADIO TAG COMMUNICATION APPARATUS

(71) Applicant: TOSHIBA TEC KABUSHIKI KAISHA, Shinagawa-ku, Tokyo (JP)

(72) Inventors: Kouichi Sano, Shizuoka-ken (JP); Jun Yaginuma, Shizuoka-ken (JP); Sunao Tsuchida, Shizuoka-ken (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/169,832

(22) Filed: Jun. 1, 2016

(65) Prior Publication Data

US 2016/0275320 A1    Sep. 22, 2016

Related U.S. Application Data

(62) Division of application No. 14/078,923, filed on Nov. 13, 2013, now Pat. No. 9,384,375.

(30) Foreign Application Priority Data

Nov. 16, 2012   (JP) ................................ 2012-252445

(51) Int. Cl.
*G06K 7/10* (2006.01)
(52) U.S. Cl.
CPC ..... *G06K 7/10237* (2013.01); *G06K 7/10009* (2013.01); *G06K 7/10198* (2013.01)
(58) Field of Classification Search
CPC ........... G06K 7/10009; G06K 7/10237; G06K 7/10198

(Continued)

(56) References Cited

U.S. PATENT DOCUMENTS 6,172,596 B1    1/2001   Cesar et al.
6,354,493 B1 *  3/2002   Mon ................... G06K 7/0008
                                                    235/380

(Continued)

FOREIGN PATENT DOCUMENTS

JP    2005-082381    3/2005
JP    2005-322084    11/2005

(Continued)

OTHER PUBLICATIONS

Non-Final Office Action for U.S. Appl. No. 14/078,923 dated Oct. 7, 2015, 17 pages.

(Continued)

*Primary Examiner* — Edwin Holloway, III
(74) *Attorney, Agent, or Firm* — Amin, Turocy & Watson LLP

(57) ABSTRACT

A radio tag communication apparatus that communicates with radio tags including storing units capable of storing identification information and state information of articles includes a search-condition setting unit for reading the state information, which is a search target, a radio tag communication unit configured to perform communication with the radio tag under a set search condition using a first reading function for reading the radio tag without designating the radio tag and a second reading function for designating the radio tag, setting a transmission output, and repeatedly reading the radio tag, a comparison determination unit configured to perform comparison determination of information read by the first reading function and the search condition, and communication control unit configured to control the radio tag communication unit according to result of the comparison determination to switch the reading operation by the first reading function to the reading operation by the second reading function.

7 Claims, 14 Drawing Sheets

(58) Field of Classification Search
USPC .................................................... 340/10.51
See application file for complete search history.

(56) References Cited

U.S. PATENT DOCUMENTS

| | | | |
|---|---|---|---|
| 7,940,161 | B2 | 5/2011 | Tanaka |
| 9,384,375 | B2 * | 7/2016 | Sano .................. G06K 7/10009 |
| 2006/0267733 | A1 | 11/2006 | Steinke et al. |
| 2008/0001721 | A1 | 1/2008 | Tanaka |
| 2008/0079549 | A1 | 4/2008 | Yamada et al. |
| 2010/0141395 | A1 | 6/2010 | Nagai |
| 2011/0199193 | A1 | 8/2011 | Sano |
| 2011/0316675 | A1 | 12/2011 | Tsujimoto et al. |

FOREIGN PATENT DOCUMENTS

| | | |
|---|---|---|
| JP | 2006-331320 | 12/2006 |
| JP | 2008-009826 | 1/2008 |
| JP | 2009-075996 | 4/2009 |
| JP | 2009-098951 | 5/2009 |
| JP | 2011-237941 | 11/2011 |

OTHER PUBLICATIONS

Japanese Office Action for Japanese Patent Application No. 2012-252445 dated Mar. 15, 2016.

* cited by examiner

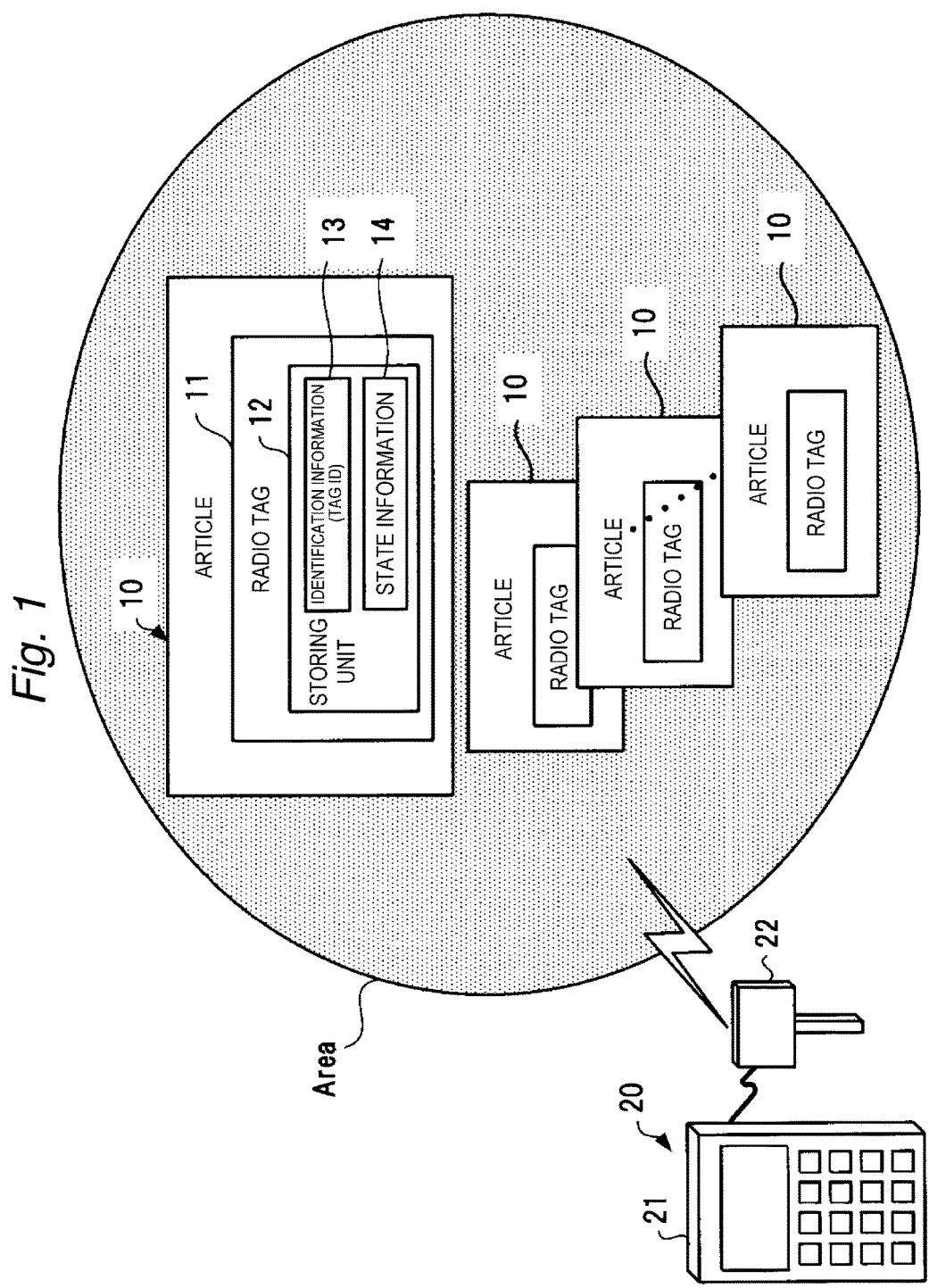

Fig. 6

PLEASE SET SEARCH CONDITION INFORMATION.

1. FRESHNESS DATE

BEFORE [ 2012 ] YEAR [ 2 ] MONTH [ 2 ] DAY

2. FRESHNESS DATE

AFTER [    ] YEAR [    ] MONTH [    ] DAY

3. MANUFACTURING DATE

BEFORE [    ] YEAR [    ] MONTH [    ] DAY

4. MANUFACTURING DATE

AFTER [    ] YEAR [    ] MONTH [    ] DAY

5. OTHERS

SEARCH CONDITION [ 1 ]

Fig. 10

PLEASE SET OPERATION INFORMATION.

1. SAVE FRESHNESS DATE CHECK DATE

[2012] YEAR [3] MONTH [3] DAY

2. READ MANUFACTURING DATE CHECK DATE

[ ] YEAR [ ] MONTH [ ] DAY

3. OTHERS

4. NO SETTING INFORMATION

OPERATION INFORMATION [1]

DESIGNATING AND WRITING FUNCTION

DESIGNATING AND READING FUNCTION

METHOD AND A RADIO TAG COMMUNICATION APPARATUS

CROSS-REFERENCE TO RELATED APPLICATIONS

This application is a Division of application Ser. No. 14/078,923 filed on Nov. 13, 2013, the entire contents of which are incorporated herein by reference.

This application is based upon and claims the benefit of priority from Japanese Patent Application No. 2012-252445, filed Nov. 16, 2012, the entire contents of which are incorporated herein by reference.

FIELD

Embodiments described herein relate generally to a radio tag communication apparatus, a radio tag communication system, and a radio tag search program with improved efficiency of work for searching for an object.

BACKGROUND

There has been a system for, in a store, a warehouse, an office, or the like, sticking a radio tag to an article such as a commodity or equipment, reading information of a storing unit of the radio tag in a non-contact manner using a radio tag communication apparatus, and detecting the presence of the article. The system can acquire information of a plurality of radio tags in a short time. Therefore, the system attracts attention in terms of, for example, efficiency of various kinds of work. As a communication range of the radio tag communication apparatus is wider, it is possible to acquire information of a larger number of radio tags.

As an example of use of the system, the radio tag is stuck to an article, an ID number (identification information) for specifying the radio tag and state information such as manufacturing year, month, and the like of the article are stored in the storing unit of the radio tag, and the state information of the radio tag is read by the radio tag communication apparatus to detect whether the article is within an expiration date for use (or within a freshness date).

JP-A-2011-237941 discloses a radio tag communication apparatus that detects a radio tag having specific ID information out of a plurality of radio tags and performs recognition work for an article.

The radio tag communication apparatus in the past stores identification information and state information of radio tags in a server or the like, extracts the identification information of the radio tags stuck to articles having an expired expiration date for use, and creates list information (an ID list). When the list information is acquired beforehand, search work can be performed by setting a search ID in the radio tag communication apparatus. However, the list information (the ID list) sometimes cannot be acquired beforehand.

For example, articles including radio tags are shipped and further passed to a final delivery destination through an intermediate delivery destination. In some case, individual item management is not performed in the intermediate delivery destination using identification information of the radio tags. Therefore, when work for searching for and removing articles having an expired expiration date for use is performed in the intermediate deliver destination, first, an operator needs to move around the intermediate delivery destination while reading radio tags present in the intermediate delivery destination using the radio tag communication apparatus and read identification information and state information of all the radio tags present in the intermediate delivery destination, and, then, extract, from the read information, radio tags of articles having the expired expiration date of use and generate list information (an ID list). Further, the operator sets an ID for search in the radio tag communication apparatus and searches for and removes the articles having the expired expiration date for use and the radio tags of the articles. That is, after moving around the intermediate deliver destination in order to generate the list information (the ID list), the operator has to move around the intermediate delivery destination again in order to search for and remove the articles having the expired expiration date for use.

DESCRIPTION OF THE DRAWINGS

FIG. 1 is an explanatory diagram of article search performed using a radio tag communication apparatus according to an embodiment;

FIG. 6 is an explanatory diagram showing an example of a setting input screen for search conditions in the embodiment;

FIG. 10 is an explanatory diagram showing an example of a setting input screen for operation information in the second embodiment;

DETAILED DESCRIPTION

Figure 2A:
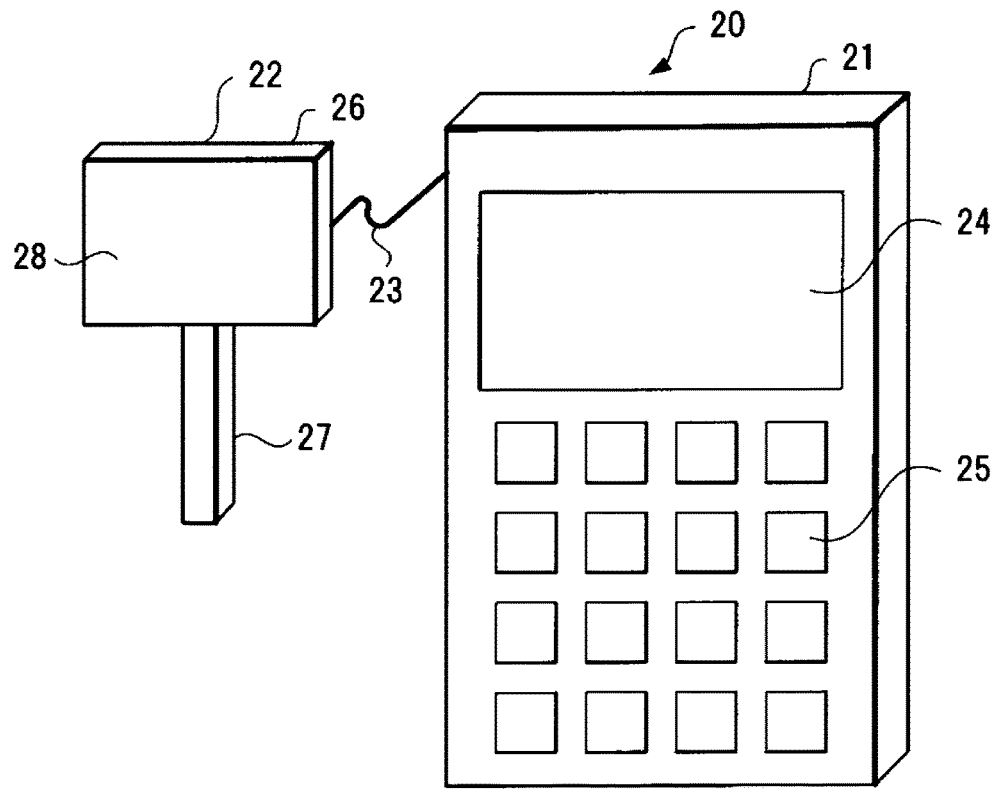
FIG. 2A is an external view of the radio tag communication apparatus.

It is an object of the embodiments to provide a radio tag communication apparatus, a radio tag communication system, and a radio tag search program that can search for an article meeting a condition such as an expired expiration of date for use in a short time even when list information (an ID list) is absent.

In general, according to one embodiment, there is provided a radio tag communication apparatus that communicates with radio tags provided in a plurality of articles and including storing units capable of storing identification information and state information of the articles, the radio tag communication apparatus including: a search-condition setting unit configured to set a search condition for reading the state information, which is a search target, from the storing unit of the radio tag; a radio tag communication unit configured to perform communication with the radio tag under the set search condition using a first reading function for performing a reading operation without designating the radio tag and a second reading function for designating the radio tag, setting a transmission output corresponding to a reading state of the designated radio tag, and repeatedly performing the reading operation; a comparison determination unit configured to perform comparison determination of information read from the radio tag by the first reading function and the search condition; and a communication control unit configured to control the radio tag communication unit according to a result of the comparison determination and control, when the radio tag communication unit reads state information meeting the search condition from the radio tag using the first reading function, the radio tag communication unit to switch the reading operation by the first reading function to the reading operation by the second reading function.

Embodiments are explained below with reference to the drawings. In the figures, the same components are denoted by the same reference numerals and signs.

First Embodiment

FIG. 1 is an explanatory diagram of article search performed using a radio tag communication apparatus according to a first embodiment. An article 10 is a commodity or equipment. A plurality of articles (10, 10, . . . ) are present at least in a target area (Area). A radio tag 11 is provided in each of the articles 10. Identification information (a tag ID) 13 for specifying the radio tag 11 and state information 14 of the article 10 are stored in a storing unit 12 of the radio tag 11. The state information 14 is information such as a freshness date or an expiration date for use and a manufacturing date of the article 10 and is reference information in determining the present state of the article 10.

In the following explanation, it is assumed that the article 10 is a commodity and year, month, and day of a freshness date is stored as the state information 14. The radio tag 11 is stuck to the article 10 carried in and out of the target area (Area). In an example explained below, an operator performs work for searching for and removing an article having an expired freshness date from the target area (Area) in a state in which the operator does not own list information of the identification information 13 and the state information 14 of radio tags present in the target area (Area).

FIG. 2A is an external view of the radio tag communication apparatus 20. The radio tag communication apparatus 20 includes a main body 21 and an antenna 22. The main body 21 and the antenna 22 are connected by a cable 23 and are portable. The main body 21 includes a notification unit 24 such as a display and an input unit 25 such as a keyboard.

In the antenna 22, a grip 27 is attached to a tabular antenna housing 26. The operator grips the grip 27 to direct an antenna surface 28 of the antenna 22 to an arbitrary direction and performs reading of a radio tag. In FIG. 2, the main body 21 and the antenna 22 are shown separate from each other. However, the main body 21 and the antenna 22 may be integrated.

Figure 2B:
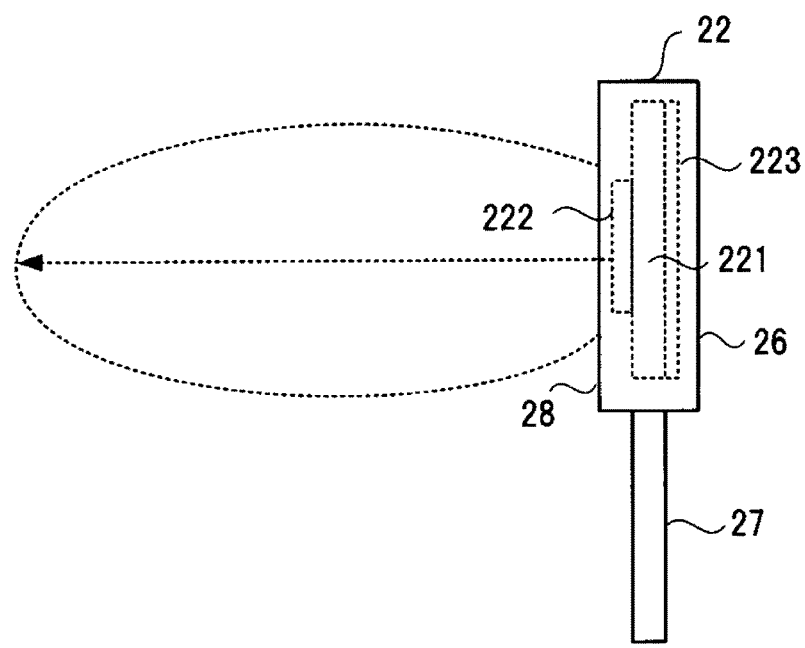
FIG. 2B is a side-view of the antenna.

As shown in FIG. 2B, the antenna 22 is a plane patch antenna in which a tabular dielectric 221 is fixed on the inside of the antenna housing 26, a radiator 222 is provided on the antenna surface 28 side of the dielectric 221, and a ground 223 is provided on a back side opposite to the radiator 222. The antenna 22 has directivity having a maximum gain in a substantially vertical direction from the center of the antenna surface 28.

Figure 3:
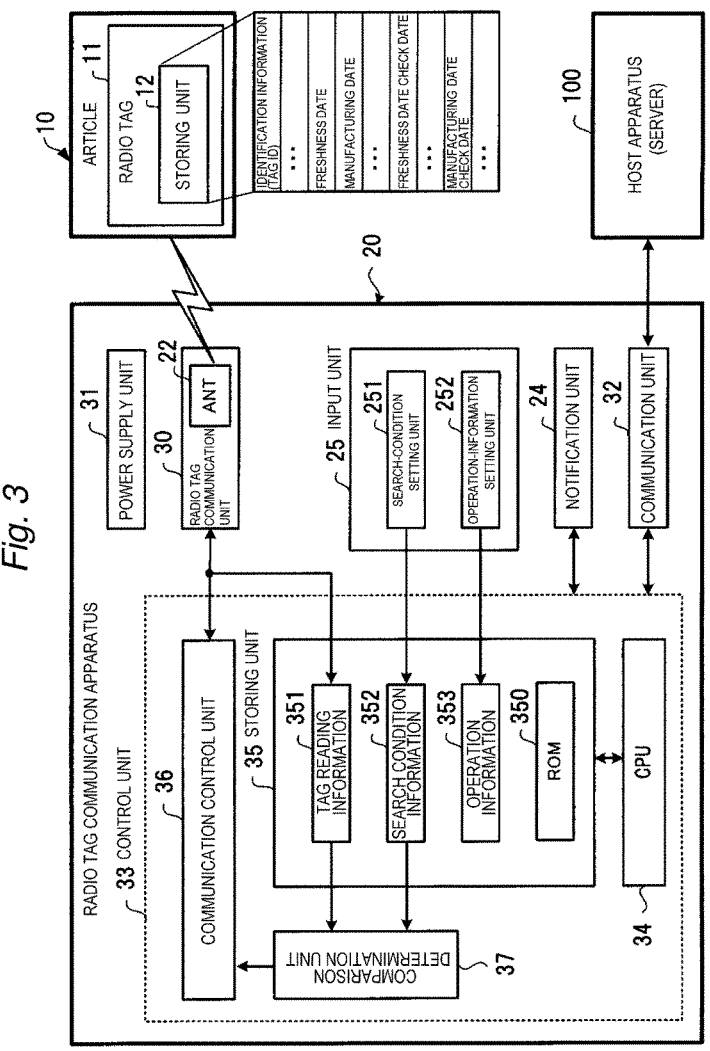
FIG. 3 is a block diagram showing the configuration of a main part of the radio tag communication apparatus.

FIG. 3 is a block diagram showing the configuration of the radio tag communication apparatus 20. The radio tag communication apparatus 20 (hereinafter simply referred to as communication apparatus 20) includes, besides the notification unit 24 and the input unit 25, a radio tag communication unit 30, a power supply unit 31, a communication unit 32 configured to perform communication with a host apparatus 100, and a control unit 33. The host apparatus 100 is for example, a server.

The notification unit 24 includes a display and a buzzer. The input unit 25 is a keyboard. The input unit 25 may be a touch panel configured on the display of the notification unit 24. The radio tag communication unit 30 includes the antenna 22. The radio tag communication unit 30 communicates with the radio tag 11 by radio and receives and reads the identification information (the tag ID) 13, the state information 14, and the like stored in the storing unit 12 of the radio tag 11. Details of the radio tag communication unit 30 are explained below.

The power supply unit 31 includes a battery and a control circuit configured to charge and discharge the battery. The communication unit 32 performs communication with the host apparatus 100 connected to the communication unit 32 via a communication line. The communication line may be either wired or wireless. Article information corresponding to the identification information of the radio tag 11 is stored in the host apparatus 100. The communication apparatus 20 can communicate with the host apparatus 100 via the communication unit 32.

The control unit 33 configures a computer and includes a CPU (Central Processing Unit) 34. The control unit 33 controls the input unit 25, the notification unit 24, the radio tag communication unit 30, the power supply unit 31, and the communication unit 32 and controls the entire communication apparatus 20. The control unit 33 includes a storing unit 35 including a ROM (Read Only Memory) 350 and a RAM (Random Access Memory). In the ROM 350 of the storing unit 35, programs, setting data, and the like used by the control unit 33 are stored in advance. In the RAM, variable data is temporarily written by the action of the control unit 33.

Further, in the RAM, tag reading information 351, search condition information 352, operation information 353, and the like are stored. The tag reading information 351 includes the identification information of the radio tag 11 received by the radio tag communication unit 30. The search condition information 352 is information concerning a search condition for reading state information, which is a search target, from the storing unit 12 of the radio tag 11. The operation information 353 is information for performing, after the radio tag 11 is specified by a search, an instruction for writing information concerning a search history in a designated area of the storing unit 12 of the radio tag 11 and reading the written information concerning the search history. The information concerning the search history is explained below.

The search condition information 352 and the operation information 353 are respectively set by a search-condition setting unit 251 and an operation-information setting unit 252 of the input unit 25. The search condition information 352 and the operation information 353 may be acquired from the host apparatus 100 via the communication unit 32 and set.

The control unit 33 includes a communication control unit 36. The communication control unit 36 sets a transmission output, transmission data, and the like in the radio tag communication unit 30 and controls the transmission output, the transmission data, and the like. The communication control unit 36 controls reception of reception data. The communication control unit 36 is explained below together with the radio tag communication unit 30.

Further, the control unit 33 includes a comparison determination unit 37. The comparison determination unit 37 compares the tag reading information 351 and the search condition information 352 and sends a comparison result to the communication control unit 36. The comparison determination unit 37 is explained below.

As shown in FIG. 3, in the storing unit 12 of the radio tag 11, identification information (a tag ID) and state information such as a freshness date and a manufacturing date are stored in a predetermined area. An area for storing information concerning a search history such as a freshness date check date and a manufacturing date check date is secured in the storing unit 12.

Figure 4:
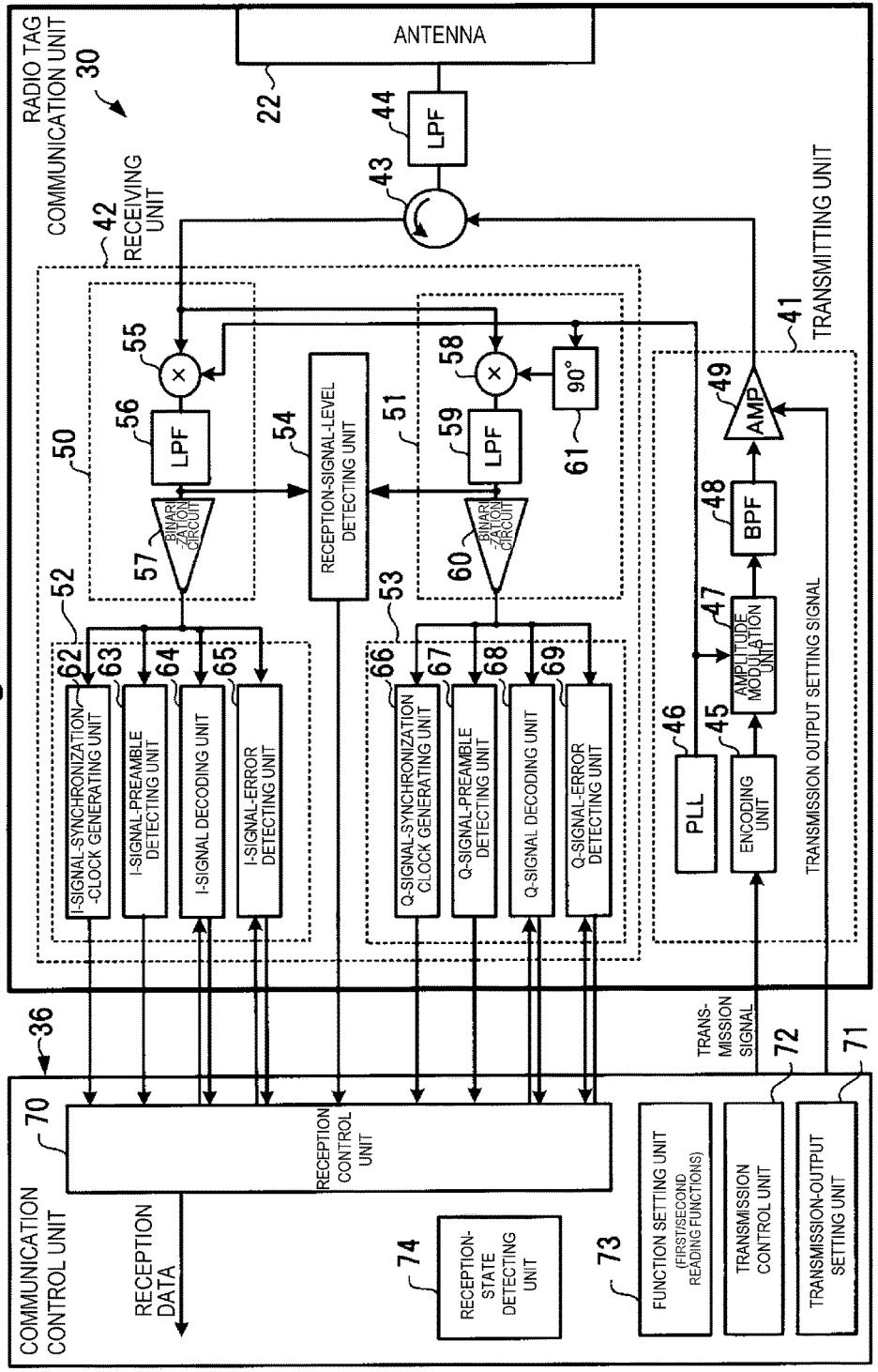
FIG. 4 is a block diagram showing specific configurations of a radio tag communication unit and a communication control unit in the embodiment.

FIG. 4 is a block diagram showing specific configurations of the radio tag communication unit 30 and the communication control unit 36. The radio tag communication unit 30 includes a transmitting unit 41 configured to transmit data to the radio tag 11, a receiving unit 42 configured to receive data from the radio tag 11, a directional coupler 43 such as a circulator, a low-pass filter 44, and the antenna 22. The transmitting unit 41, the receiving unit 42, and the low-pass filter 44 are connected to the directional coupler 43. The directional coupler 43 is connected to the antenna 22 via the low-pass filter 44.

The transmitting unit 41 includes an encoding unit 45, a PLL (Phase Locked Loop) unit 46, an amplitude modulation unit 47, a band-pass filter 48, and a power amplifier 49. The encoding unit 45 encodes a transmission signal output from a transmission control unit 72 of the communication control unit 36. The PLL unit 46 supplies a local carrier signal to the amplitude modulation unit 47. The amplitude modulation unit 47 subjects the local carrier signal received from the PLL unit 46 to amplitude modulation with the transmission signal encoded by the encoding unit 45.

The band-pass filter 48 removes an unnecessary component from the transmission signal subjected to the amplitude modulation by the amplitude modulation unit 47. The power amplifier 49 amplifies the transmission signal at an amplification ratio corresponding to a transmission output setting signal received from a transmission-output setting unit 71 of the communication control unit 36. A transmission output is changed by amplifying the transmission signal. The transmission signal amplified by the power amplifier 49 is supplied to the directional coupler 43.

The directional coupler 43 supplies the transmission signal received from the transmitting unit 41 to the antenna 22 via the low-pass filter 44. The transmission signal supplied to the antenna 22 is radiated from the antenna 22 as a radio wave. The radio tag 11 receives the radio wave radiated from the antenna 22 and starts. The started radio tag 11 applies backscatter modulation to a non-modulated signal to thereby transmit the information stored in the storing unit 12 of the radio tag 11 to the communication apparatus 20 by radio. The radio signal transmitted from the radio tag 11 is received by the antenna 22.

The reception signal received by the antenna 22 is supplied to the directional coupler 43 via the low-pass filter 44. The directional coupler 43 supplies the reception signal of the antenna 22, i.e., the signal received from the radio tag 11 to the receiving unit 42. The receiving unit 42 includes an I-signal generating unit 50, a Q-signal generating unit 51, an I-signal processing unit 52, a Q-signal processing unit 53, and a reception-signal-level detecting unit 54.

The I-signal generating unit 50 includes a mixer 55, a low-pass filter 56, and a binarization circuit 57. The Q-signal generating unit 51 includes a mixer 58, a low-pass filter 59, a binarization circuit 60, and a 90-degree phase shifter 61.

The I-signal processing unit 52 includes an I-signal-synchronization-clock generating unit 62, an I-signal-preamble detecting unit 63, an I-signal decoding unit 64, and an I-signal error detecting unit 65. The Q-signal processing unit 53 includes a Q-signal-synchronization-clock generating unit 66, a Q-signal-preamble detecting unit 67, a Q-signal decoding unit 68, and a Q-signal-error detecting unit 69.

The receiving unit 42 inputs the reception signal received from the directional coupler 43 to the first mixer 55 and the second mixer 58. The receiving unit 42 inputs the local carrier signal received from the PLL unit 46 to the first mixer 55 and the 90-degree phase shifter 61. The 90-degree phase shifter 61 shifts the phase of the local carrier signal by 90 degrees and supplies the local carrier signal to the second mixer 58.

The first mixer 55 mixes the reception signal and the local carrier signal and generates an I signal having a component in-phase with the local carrier signal. The I signal is supplied to the binarization circuit 57 via the low-pass filter 56. The low-pass filter 56 removes an unnecessary high frequency component from the I signal and extracts an encoded data component. The binarization circuit 57 binarizes the signal passed through the low-pass filter 56.

The second mixer 58 mixes the reception signal and the local carrier signal phase-shifted by 90 degrees and generates a Q signal having a component orthogonal to the local carrier signal. The Q signal is supplied to the binarization circuit 60 via the low-pass filter 59. The low-pass filter 59 removes an unnecessary high-frequency component from the Q signal and extracts an encoded data component. The binarization circuit 60 binarizes the signal passed through the low-pass filter 59.

The I signal binarized by the binarization circuit 57 is supplied to the respective units 62 to 65 of the I-signal processing unit 52. The Q signal binarized by the binarization circuit 60 is supplied to the respective units 66 to 69 of the Q-signal processing unit 53. The I-signal processing unit 52 and the Q-signal processing unit 53 are common in operations thereof. Therefore, in the following explanation, the I-signal processing unit 52 is explained. Explanation of the Q-signal processing unit 53 is omitted.

The synchronization-clock generating unit 62 always generates a clock signal synchronized with the binarized signal received from the binarization circuit 57 and supplies the generated clock signal to a reception control unit 70 of the communication control unit 36, the I-signal-preamble detecting unit 63, the I-signal decoding unit 64, and the I-signal-error detecting unit 65.

The I-signal-preamble detecting unit 63 detects, on the basis of the clock signal received from the I-signal-synchronization-clock generating unit 62, a preamble affixed to the top of the I signal. When the preamble is detected, the I-signal-preamble detecting unit 63 outputs a detection signal to the reception control unit 70 of the communication control unit 36. Upon receiving the preamble detection signal, the reception control unit 70 supplies a command signal for starting decoding to the I-signal decoding unit 64. The I-signal decoding unit 64 samples the binarized signal received from the binarization circuit 57 in synchronization with the clock signal received from the I-signal-synchronization-clock generating unit 62. Upon receiving the instruction for starting decoding from the reception control unit 70, the I-signal decoding unit 64 decodes the sampled binarized signal. The decoded data is supplied to the reception control unit 70.

The reception control unit 70 supplies, the decoded data to the I-signal-error detecting unit 65. The I-signal-error detecting unit 65 detects presence or absence of an error from a check code of the decoded data. The I-signal-error detecting unit 65 supplies data indicating a detection result to the reception control unit 70. When there is no error in at least one of the I signal and the Q signal, the reception control unit 70 determines that the data is correctly received. The correctly received reception data is stored in the storing unit 35 as the tag reading information 351.

The reception-signal-level detecting unit 54 detects the amplitude of the I signal passed through the low-pass filter 56 and the amplitude of the Q signal passed through the low-pass filter 59. The reception-signal-level detecting unit 54 notifies the communication control unit 36 of a value of the larger one of the amplitudes as a reception signal level. Alternatively, the reception-signal-level detecting unit 54 may notify the communication control unit 36 of a value of Expression (1) below obtained by vector-synthesizing the I signal and the Q signal as the reception signal level.

$$\sqrt{(I^2+Q^2)} \quad (1)$$

The communication control unit 36 includes, besides the reception control unit 70, the transmission-output setting unit 71, the transmission control unit 72, a function setting unit 73, and a reception-state detecting unit 74. The reception-state detecting unit 74 calculates a reception success rate in a predetermined time. Alternatively, the reception-state detecting unit 74 may detect a reception state using an average value or a maximum value of reception signal levels notified from the reception-signal-level detecting unit 54 in the predetermined time. The reception success rate is calculated by Expression (2) below.

Reception success rate=the number of times data is correctly received/(the number of times data is correctly received+the number of times errors are detected) (2)

In an example explained below, a protocol of ISO18000-60 is used. The communication apparatus 20 has two reading functions, i.e., a first reading function (a normal reading function) and a second reading function (a designation repeating reading function) in which the protocol of ISO18000-6C is used. The communication control unit 36 includes the function setting unit 73. The function setting unit 73 sets one of the first reading function and the second reading function. The transmission control unit 72, the transmission-output setting unit 71, and the reception-state detecting unit 74 of the communication control unit 36 are configured to perform, according to functions set by the function setting unit 73, operations corresponding to the functions.

The first reading function is a function of performing reading without designating a radio tag. The communication control unit 36 receives a radio wave radiated from the antenna 22 and starts, performs communication with the radio tag 11 in a communicable state, and reads the identification information 13 and the state information 14 stored in the storing unit 12 of the radio tag 11.

The second reading function is a function of designating a responding radio tag 11 according to a Select command of ISO18000-6 type C and repeating reading of the identification information 13 and the state information 14 stored in the storing unit 12 of the radio tag 11. The second reading function is also a function of setting a transmission output setting signal in the transmission-output setting unit 71 according to a reception state detected by the reception-state detecting unit 74 to control a transmission output and narrowing down a presence range of the designated radio tag 11. The second reading function supports the operator in specifying the designated radio tag 11. In the second reading function, the reception state detected by the reception-state detecting unit 74 of the communication control unit 36 is notified by the notification unit 24.

The two reading functions, i.e., the first reading function and the second reading function in search work are explained below.

Figure 5A:
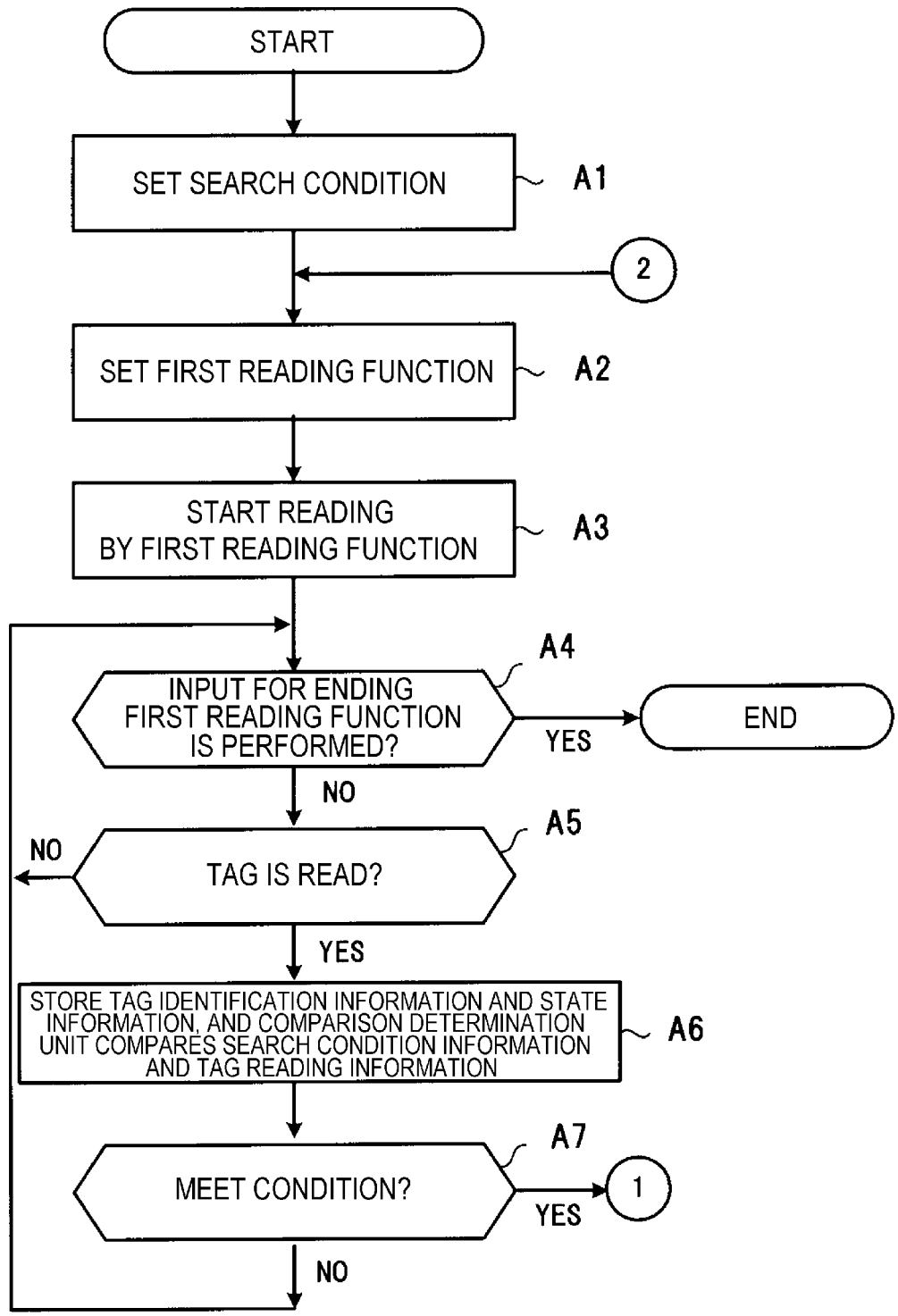
FIG. 5A is a flowchart for explaining a processing procedure of a control unit in the embodiment.
Figure 5B:
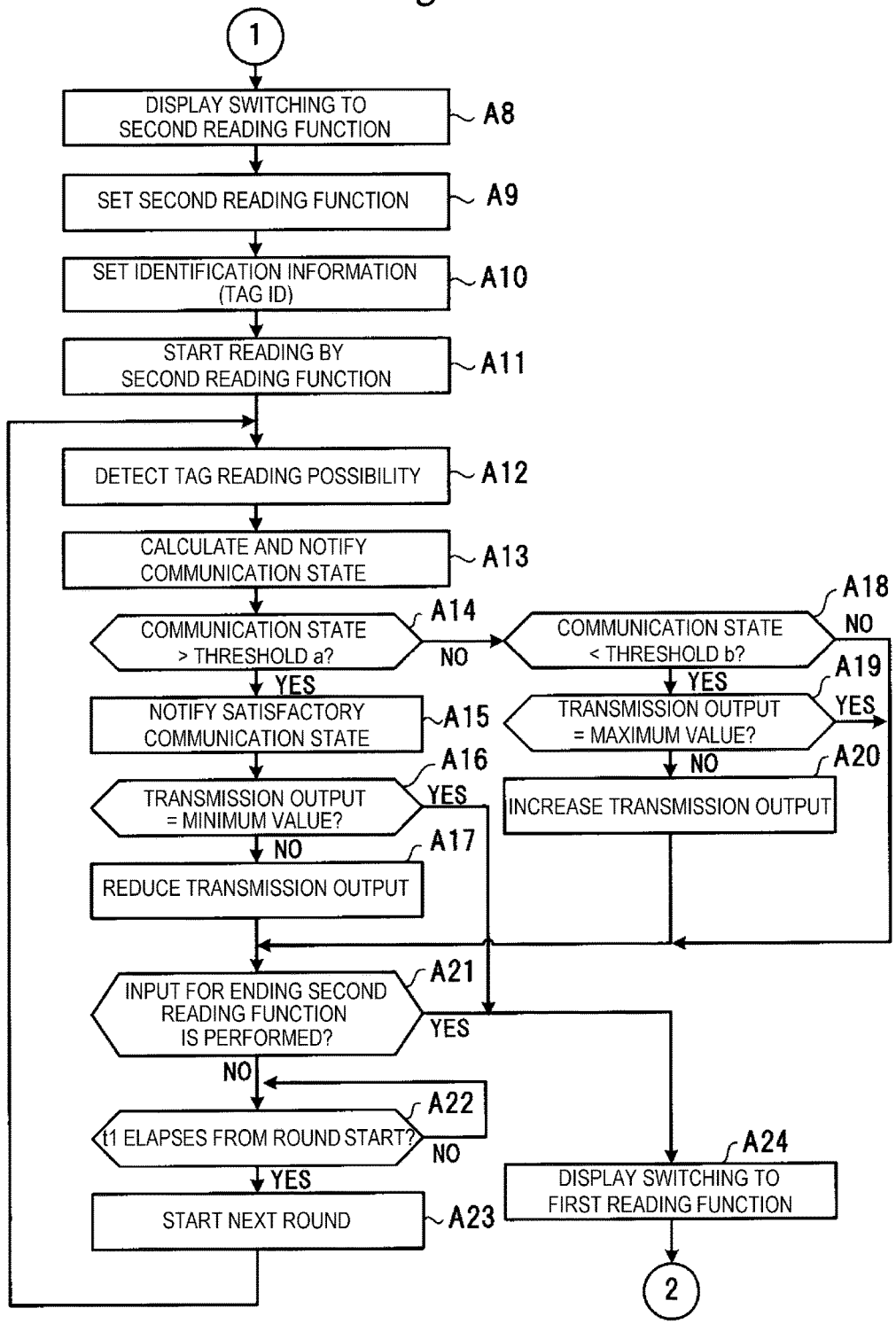
FIG. 5B is a flowchart for explaining a processing procedure of the control unit following FIG. 5A.

FIGS. 5A and 5B are flowcharts for explaining a processing procedure performed by the control unit 33 when the operator performs work for searching for and removing an article having an expired freshness date from the target area (Area) using the communication apparatus 20. The procedure is controlled by a radio tag search program stored in the ROM 350 of the storing unit 35.

When the operator carries the communication apparatus 20 in the target area (Area) shown in FIG. 1 and operates, for example, a work start key of the input unit 25, the search program starts. First, the control unit 33 sets a search condition in Act A1 in FIG. 5A. In Act A1, the control unit 33 displays, with the search-condition setting unit 251, a screen shown in FIG. 6 on the display (the notification unit) 24 and urges the operator to input data.

FIG. 6 is an explanatory diagram showing an example of a setting input screen for search conditions. In FIG. 6, items "1. Freshness date" (before ), "2. Freshness date" (after ), "3. Manufacturing date" (before ), and "4. Manufacturing date" (after ) can be selected. The respective dates can be input. The operator operates keys of the input unit 25 and inputs dates to relevant input frames.

In an input example shown in FIG. 6, a freshness date before Feb. 2, 2010 is set as a search condition. When a determination key of the input unit 25 is pressed by the operator, the control unit 33 stores input information in the storing unit 35 as search condition information 352. In FIG. 6, when "5. Others" is pressed, the setting input screen transitions to a screen on which more detailed conditions can be set.

The control unit 33 knows in advance a designated area (a storage location) of the storing unit 12 of the radio tag 11 corresponding to the item (the freshness date or the manufacturing date) of each search condition. For example, when the freshness date is set as the search condition, the control unit 33 learns a designated area (a storage location) of freshness date information of the storing unit 12 of the radio tag 11.

Subsequently, the control unit 33 sets the first reading function in the function setting unit 73 of the communication control unit 36 (Act A2 in FIG. 5A). In Act A2, the transmission-output setting unit 71 outputs a transmission output setting signal corresponding to a predetermined transmission output in the case of the first reading function. The transmission control unit 72 outputs a transmission signal in the case of the first reading function. The transmission control unit 72 sets transmission timing and the like. At this point, a search condition is set on the basis of the search condition information 352. The identification information 13 and the state information 14 of the radio tag 11 are read under the set search condition. The state information 14 is, for example, information concerning the freshness date.

Subsequently, the control unit 33 starts normal reading with the first reading function (Act A3). When the transmission-output setting unit 71 outputs the transmission output setting signal, a non-modulated carrier signal is radiated from the antenna 22 as a radio wave. When the transmission control unit 72 outputs the transmission signal, transmission to the radio tag 11 is performed. The control unit 33 determines whether a key input for ending the first reading function is performed from the input unit 25 (Act A4) and continues the normal reading until the key input for ending the first reading function is detected. When the key input for ending the first reading function is performed, the control unit 33 ends the processing.

Figure 7:
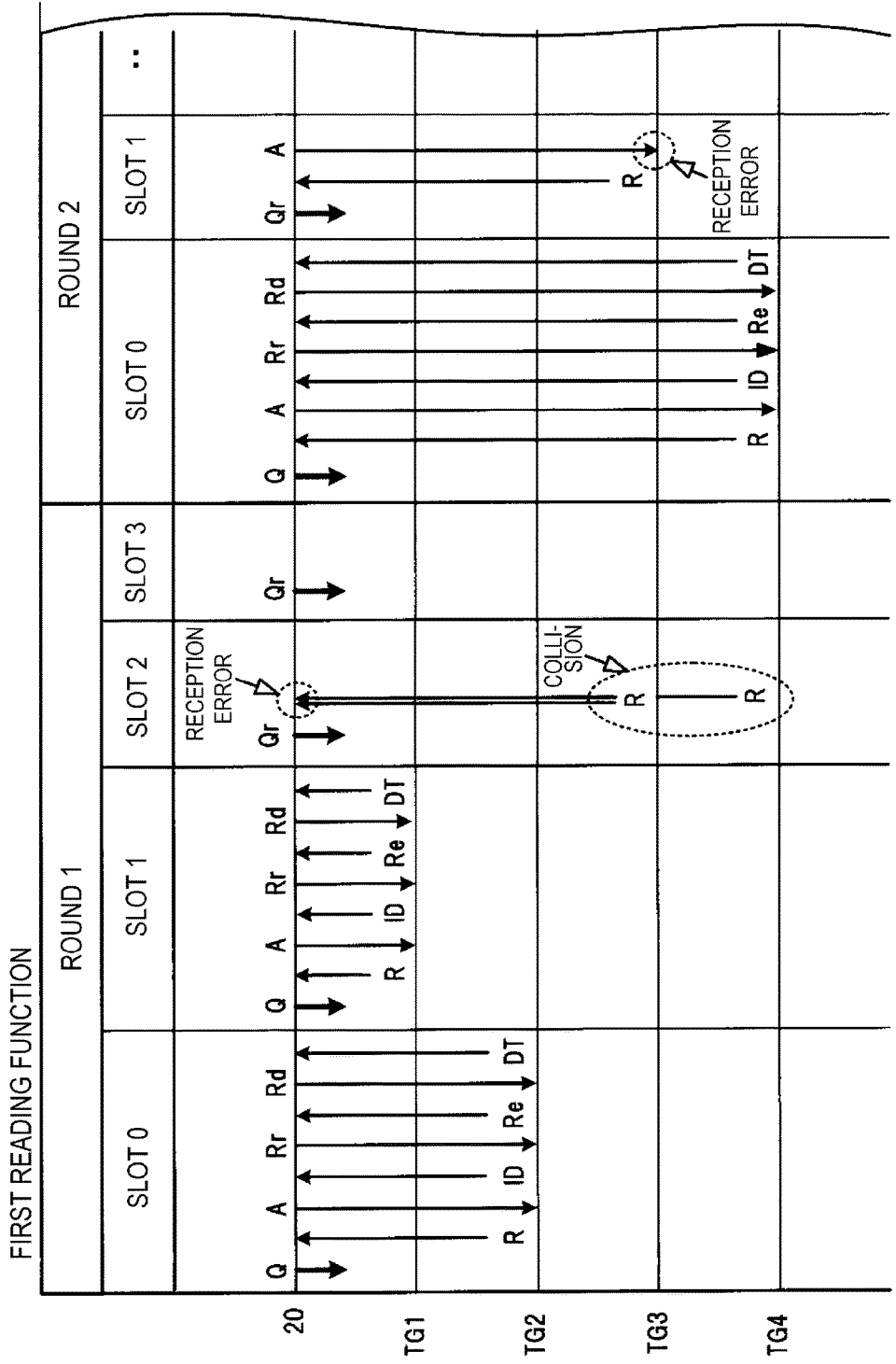
FIG. 7 is a timing chart of a radio communication protocol of a first reading function in the embodiment.

FIG. 7 is a timing chart showing an example of a radio communication protocol between the communication apparatus 20 and the radio tags 11 (four radio tags TG1 to TG4). As explained above, in this example, the radio communication protocol conforms to the protocol of ISO18000-6 type C. The number of slots per one round is set to "4".

In FIG. 7, all signs [Q], [R], [A], [ID], and [Qr] indicate communication data. Preamble codes indicating the top of data are included in the tops of the communication data. Error detection codes such as CRC (Cyclic Redundancy Check) codes are included in the communication data. A reception side can detect an error.

First, the communication apparatus 20 transmits a non-modulated carrier signal from the antenna 22 as a radio wave. The radio tags TG1 to TG4 receive the radio wave and start. Subsequently, the communication apparatus 20 transmits a Query command [Q] for commanding a start of reading of a first round. A parameter (a Q value=2) for setting the number of slots per one round to "4" is included in the Query command [Q]. Upon receiving the Query command [Q], the radio tags TG1 to TG4 generate random numbers. According to the random numbers, the radio tags TG1 to TG4 determine in which of the four slots in one round the radio tags TG1 to TG4 respond. According to the random numbers, the radio tags TG1 to TG4 generate response data [R]. Since the response data [R] is generated according to the random numbers, the response data [R] is a different value for each of the radio tags. In the same radio tag, the response data [R] is a different value every time the random number is generated.

In the example shown in FIG. 7, the radio tag TG2 transmits the response data [R] in a first slot 0. Upon receiving the response data [R] from the radio tag TG2, the communication apparatus 20 transmits an Acknowledge (Ack) command [A] indicating that the response data [R] is normally received. The response data [R] received from the radio tag TG2 is included in the Ack command [A].

The radio tag TG2, which transmits the response data [R], waits for the Ack command [A]. Upon receiving the Ack command [A], the radio tag TG2 checks whether the response data [R] transmitted by the radio tag TG2 is included in the Ack command [A]. When the response data [R] is included in the Ack command [A], the radio tag TG2 recognizes that the Ack command [A] is addressed to the radio tag TG2 and transmits ID information [ID] stored in a memory of the radio tag TG2. Upon receiving the ID information [ID], the communication apparatus 20 detects presence or absence of an error. When there is no error, the communication apparatus 20 stores the received ID information [ID] in the storing unit 35 as the tag reading information 351.

Subsequently, the communication apparatus 20 transmits a ReqRN command [Rr] to the radio tag TG2 in order to continue communication and waits for Reply information [Re]. Upon receiving the Reply information [Re], similarly, the communication apparatus 20 detects presence or absence of an error. When there is no error, the communication apparatus transmits a Read command [R] including top address information and data amount information of the storing unit 12 of the radio tag 11 in which a search item (in this embodiment, the freshness date) set in the search condition information 352 is stored and waits for state information (in this embodiment, information including the freshness date) [DT]. Upon receiving the state information [DT], the communication apparatus 20 detects presence or absence of an error. When there is no error, the communication apparatus 20 stores the received state information [DT] in the storing unit 35 as the tag reading information 351.

Subsequently, the communication apparatus 20 transmits a Query-rep command [Qr] in order to command switching of a slot. However, even if the radio tag TG2 that already transmits the response data [R] receives the Query-rep command [Qr], the radio tag TG2 does not respond. In the example shown in FIG. 7, the radio tag TG1 transmits the response data [R] in a second slot 1. Operations in the second slot 1 and subsequent slots are the same as the operation in the first slot 0. Therefore, explanation of the operations is omitted. When communication in the second slot 1 ends, the communication apparatus 20 transmits the Query-rep command [Qr] for commanding switching of a slot. However, even if the radio tags TG1 and TG2 that already transmit the response data [R] receive the Query-rep command [Qr], the radio tags TG1 and TG2 do not respond.

In the example shown in FIG. 7, the radio tags TG3 and TG4 respectively transmit different response data [R] in a third slot 2. Transmission start time of the response data [R] is specified within a predetermined time from the reception of the Query command [Q] or the Query-rep command [Qr]. Therefore, when two or more radio tags respectively transmit the response data [R] in the same slot, parts of the transmission of the response data [R] always collide with each other. Therefore, the communication apparatus 20 cannot receive the response data [R] of the radio tag TG3 and the response data [R] of the radio tag TG4. The communication apparatus 20 detects reception timeout of the response data [R].

Subsequently, the communication apparatus 20 transmits the Query-rep command [Qr] for commanding switching of a slot and starts a fourth slot 3. However, in the example shown in FIG. 7, the radio tags TG1 to TG4 already transmit the response data [R] in the round 1. Therefore, the response data [R] is not transmitted in the fourth slot 3. The communication apparatus 20 detects reception timeout of the reception data [R].

The communication apparatus 20 detects the end of the four slots in the round 1 and transmits the Query command [Q] for commanding the start of the first slot 0 in a new round 2. In the example shown in FIG. 7, the radio tags TG1 and TG2 that transmit the ID information [ID] do not respond in the round 2 and subsequent rounds either. In the first slot 0 in the round 2, the radio tag TG4 transmits the response data [R]. The following operation of the first slot 0 in the round 2 is the same as the operation of the first slot 0 in the round 1. Therefore, explanation of the operation is omitted.

When communication in the first slot 0 in the round 2 ends, the communication apparatus 20 transmits the Query-rep command [Qr] for commanding switching of a slot. In the second slot 1 in the round 2, the radio tag TG3 transmits the response data [R]. Upon receiving the response data [R] from the radio tag TG3, the communication apparatus 20 transmits the Ack command [A] for indicating that the response data [R] is normally received. In the example shown in FIG. 7, for example, the radio tag TG3 is present behind an object, a signal of the Ack command [A] transmitted by the communication apparatus 20 is attenuated, and the radio tag TG3 detects a reception error when the Ack command [A] is received.

After transmitting the Ack command [A], the communication apparatus 20 waits for reception of the ID information [ID] from the radio tag TG3. However, since the reception timeout occurs, the communication apparatus 20 switches the second slot 1 to the next slot in the same manner as explained above. Thereafter, the communication apparatus 20 performs operations same as the operations explained above. The communication apparatus 20 communicates with a large number of radio tags in the target area (Area) using the normal reading function and receives the ID information [ID].

Referring back to FIG. 5A, the control unit 33 detects whether the tag identification information 13 and the state information 14 are read by the first reading function (Act A5). When detecting that the tag identification information 13 and the state information 14 are read, the control unit 33 stores the tag identification information 13 and the state information 14 read by the first reading function in the storing unit 35 as the tag reading information 351. The comparison determination unit 37 compares the search condition information 352 and the state information (in this embodiment, the freshness date) of the tag reading information 351 (Act A6).

In Act A7, the control unit 33 determines a comparison result of the comparison determination unit 37. When determining that the read state information of the radio tag does not meet the search condition, the control unit 33 returns to Act A4 and continues the reading operation by the first reading function. When determining in Act A7 that the state information meets the search condition, the control unit 33 stops the reading operation by the first reading function, switches the reading operation to a reading operation by the second reading function, and shifts to the flowchart of FIG. 5B. The operator can operate the input unit 25 to perform a key input to switch the first reading function to the second reading function.

Subsequently, as shown in FIG. 5B, the control unit 33 displays on the display 24 to the effect that the first reading function is switched to the second reading function (Act A8). The control unit 33 sets the second reading function in the function setting unit 73 of the communication control unit 36 (Act A9). In Act A9, the output setting unit 71 outputs a transmission output setting signal corresponding to an initial value of a predetermined transmission output in the case of the second reading function. The transmission control unit 72 outputs a transmission signal in the case of the second reading function. The transmission control unit 72 sets transmission timing and the like. To simplify the explanation, the initial value of the transmission output is set to a maximum value of a transmission output that can be set in the communication apparatus 20.

Subsequently, the control unit 33 sets, as a target of the second reading function, the radio tag 11 determined as meeting the search condition on the basis of a result of comparison of the state information [DT] read in the reading operation by the first reading function and the search condition information 352 by the comparison determination unit 37. Since the identification information of the relevant radio tag 11 is acquired by the first reading function, in the second reading function, the control unit 33 sets the identification information of the radio tag 11 (Act A10) and specifies the radio tag 11. In the following explanation, it is assumed that the radio tag TG4 shown in FIG. 7 meets the search condition, identification information of the radio tag TG4 is set, and reading by the second reading function is performed.

Subsequently, the control unit 33 starts a reading operation by the second reading function (the designation repeating reading function) (Act A11). When the transmission-output setting unit 71 outputs a transmission output setting signal, a non-modulated carrier signal is radiated from the antenna 22 as a radio wave. When the transmission control unit 72 outputs a transmission signal, transmission to the radio tag 11 is performed.

Figure 8:
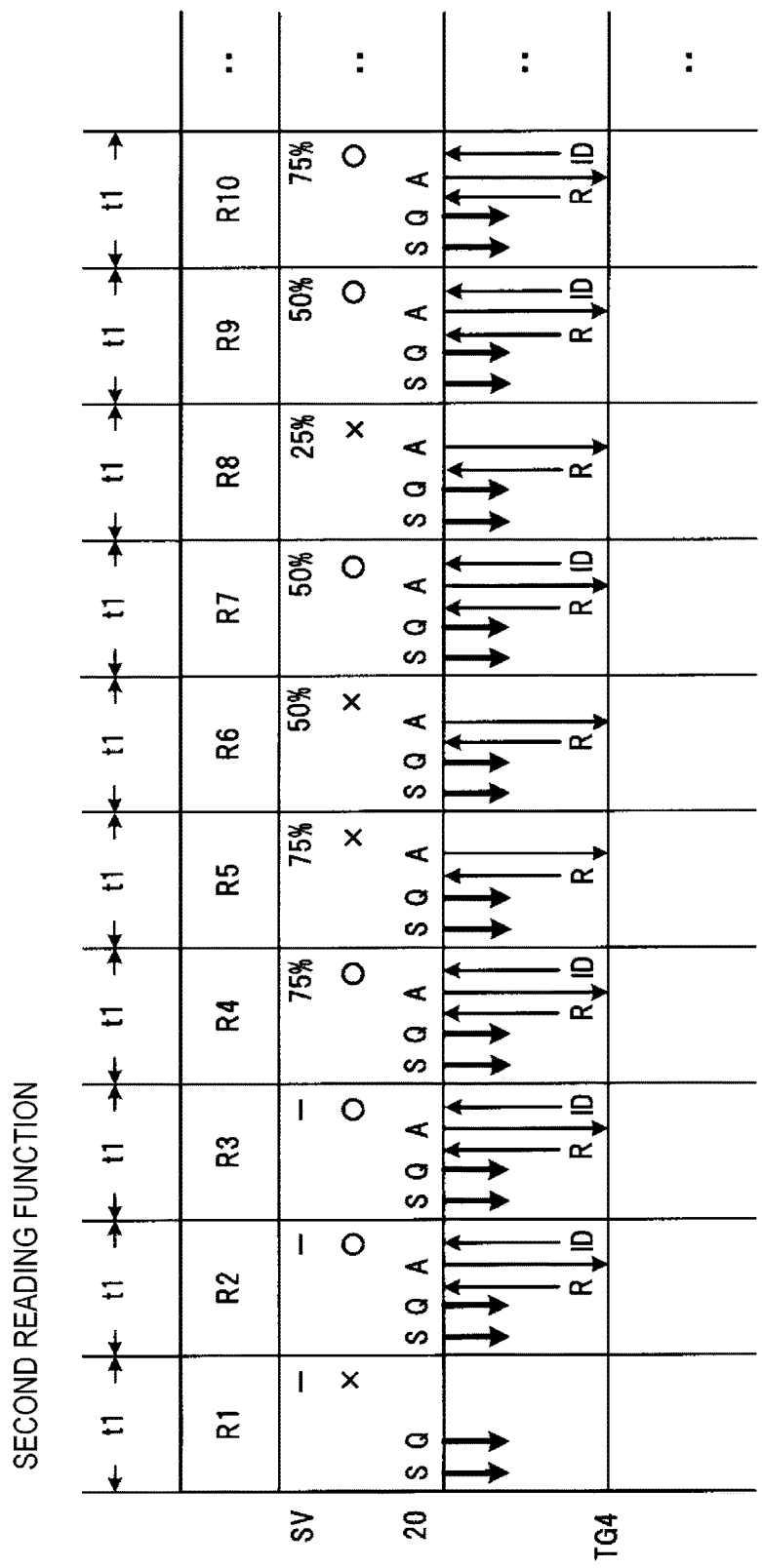
FIG. 8 is a timing chart of a radio communication protocol in a second reading function in the embodiment.

FIG. 8 is a timing chart showing an example of a radio communication protocol between the communication apparatus 20 and the radio tag TG4. As in FIG. 7, in this example, the radio communication protocol conforms to the protocol of ISO18000-6 type C. The number of slots per one round is set to "1".

In FIG. 8, all signs [S], [Q], [R], [A], and [ID] indicate communication data. Preamble codes indicating the top of data are included in the tops of the communication data. Error detection codes such as CRC (Cyclic Redundancy Check) codes are included in the communication data excluding [S]. A reception side can detect an error.

Circles in FIG. 8 mean reception success of the ID information [ID] by the communication apparatus 20 in respective rounds. X-marks mean reception failure. First, as explained above, the communication apparatus 20 transmits a non-modulated carrier signal from the antenna 22 as a radio wave. Subsequently, the communication apparatus 20 transmits a Select command [S], then, transmits the Query command [Q], and starts a first round R1. In the Select command [S], the identification information of the radio tag TG4 is set such that only the radio tag TG4, which is a target of the designation repeating reading function, responds. When the radio tags other than the radio tag TG4 receive the Select command [S] and the Query command [Q], the other radio tags determine that identification information different from the identification information of the other radio tags is designated and does not transmit the response signal [R]. The first round R1 is an example in which the communication apparatus 20 detects reception timeout during standby for the response signal [R] because, for example, a sufficient radio wave does not reach the radio tag TG4.

When time t1 elapses from the start of the transmission of the Select command [S] in the round R1, the communication apparatus 20 transmits the Select command [S] in which the identification information of the radio tag TG4 is set such that only the radio tag TG4 responds, then, transmits the Query command [Q], and starts a second round R2. The second round R2 indicates an example in which the communication apparatus 20 correctly receives the ID information [ID] from the radio tag TG4. Thereafter, similarly, when time t1 elapses from the start of the transmission of the Select command [S], the communication apparatus 20 transmits the Select command [S] in which the identification information of the radio tag TG4 is set such that only the radio tag TG4 responds, then, transmits the Query command [Q], and starts the next round. Rounds R5 and R6 and a round R8 indicate an example in which, after transmitting the Ack command [A], the communication apparatus 20 detects reception timeout while waiting for the ID information [ID], and fails in reception of the ID information [ID].

The control unit 33 detects whether the ID information [ID] is correctly received in the rounds and calculates, for example, a communication success rate including a reception possibility result of the ID information [ID] in the former three rounds. In the example shown in FIG. 8, a communication success rate SV in the round R4 is calculated as 75% from a reception possibility result of the ID information [ID] in the round R1 to the round R4. In the round R5, the communication success rate SV is calculated as 75% from a reception possibility result of the ID information [ID] in the round R2 to the round R5.

Referring back to FIG. 5B, after starting the reading operation by the second reading function in Act A11, the control unit 33 detects reading possibility of the ID information [ID] of the radio tag 11 in the round (Act A12). The control unit 33 calculates a communication state (Act A13). The control unit 33 calculates the communication success rate SV as the communication state. The control unit 33 may display the calculated communication success rate SV on the display 24.

Subsequently, the control unit 33 compares the calculated communication success rate SV with a threshold "a" (Act A14). When the communication success rate SV is larger than the threshold "a", the control unit 33 determines that a communication state is satisfactory. For example, the threshold "a" is set to 70%. When the communication success rate SV is larger than the threshold "a", in order to indicate that the communication state is satisfactory, the control unit 33 displays, for example, "The target radio tag is present in the direction in which the antenna is directed. Please proceeds in the direction" on the display 24 (Act A15).

The control unit 33 compares the present transmission output of the communication apparatus 20 and a minimum value of a transmission output in the second reading function set in advance (Act A16). When the transmission output of the communication apparatus 20 is set to the minimum value, a reading range in specifying a target radio tag with the second reading function is minimized. An initial value, a maximum value, and a minimum value of the transmission output in the second reading function is set in advance by the operator.

When the present transmission output is larger than the minimum value, the control unit 33 reduces the transmission output by one step (Act A17) and narrows the reading range. When the present transmission output is the minimum value, the control unit 33 displays on the display 24 to the effect that "the target radio tag is present within the smallest reading range" and "the second reading function is ended and switched to the first reading function" (Act A24).

When the communication success rate SV is equal to or smaller than the threshold "a" in Act A14, the control unit 33 compares the communication success rate SV with a threshold "b" (Act A18). When the communication success rate SV is smaller than the threshold "b", the control unit 33 determines that a communication state is poor. For example, the threshold "b" is set to 30%. The control unit 33 compares the present transmission output of the communication apparatus 20 and the maximum value of the transmission output in the second reading function set in advance (Act A19). When the present transmission output is smaller than the maximum value, the control unit 33 increases the transmission output by one step (Act A20).

Subsequently, the control unit 33 detects whether a key input for ending the second reading function is performed with the input unit 25 (Act A21). When the key input for the end is detected, the control unit 33 displays on the display 24 to the effect that "since the input for ending the second reading function is detected, the second reading function is switched to the first reading function (Act A24) and returns to Act A2 in FIG. 5A. When the key input for the end is not detected, the control unit 33 continues the reading operation by the second reading function.

When detecting that time t1 elapses from the start of the round (Act A22), the control unit 33 transmits the Select command [S] in which the identification information of the radio tag TG4 is set, then, transmits the Query command [Q], starts the next round (Act A23), and returns to Act A12 and repeats the processing. That is, when a radio tag relevant to an expired freshness date is found in the first search, the second and third searches are performed excluding the radio tag. The operator determines the number of times of searches.

As explained above, even in a state in which the operator does not acquire information concerning a search ID list in advance, according to the reading operation by the first reading function, the operator can acquire identification information and state information of radio tags present, determine, with the comparison determination unit 37, whether the radio tags meet a search condition, when the radio tags meet the search condition, easily narrow down, with the reading operation by the second reading function, a presence range of relevant radio tags and articles to a reading range at a set transmission output minimum value, and specify a radio tag and an article. Therefore, even in the state in which the operator does not acquire the information concerning the ID list in advance, if the operator moves around the target area (Area), the operator can specify a radio tag and an article meeting the condition.

In the example shown in FIG. 8, a communication state is determined using the communication success rate SV. However, the number of rounds in which the ID information [ID] is received in succession, the number of rounds in which the ID information [ID] cannot be received in succession, or other methods may be used. In the example shown in FIG. 8, the time of the rounds is fixed to t1. However, the time of the rounds may be changed according to reading possibility of the ID information [ID].

An area for storing identification information of a radio tag found by the reading operation by the second reading function may be provided in the storing unit 35 of the communication apparatus 20. The control unit 33 may have a function of not repeating a search for the radio tag found by the second reading function once.

Further, in FIG. 7, in some case, identification information and state information of a plurality of radio tags in one round are read and it is determined by the comparison determination unit 37 that a plurality of radio tags meet the search condition. In this case, in FIG. 5B, an identification number of a first radio tag determined as meeting the search condition is set and the reading operation by the second reading function is performed and, when the second reading function ends for the first radio tag, subsequently, an identification number of the next radio tag is set and the reading operation by the second reading function is performed. When the reading operation by the second reading function ends for a plurality of radio tags determined as meeting the search condition, the second reading function may be switched to the first reading function.

A section for executing a program stored in the ROM 350 is schematically explained. When a search condition is set using the search condition setting screen shown in FIG. 6, the storing unit 35, which receives and stores information concerning the search condition information, executes the search condition processing function as indicated by Act A1 in FIG. 5A.

As indicated by Acts A2 and A3 in FIG. 5A and Acts A9 to A20 in FIG. 5B, the radio tag communication unit 30 executes, with the first reading function and the second reading function, a communication function for performing communication with the radio tag under a set search condition.

The comparison determination unit 37 executes a comparison determination function for performing comparison determination of information read from the radio tag by the first reading function and the search condition.

Further, as indicated by Acts A8 to A11 in FIG. 5B, the communication control unit 36 executes a control function for performing control to switch a communication function according to a result of the comparison determination and, when state information meeting the search condition is read from the radio tag by the first reading function, switch the reading operation by the first reading function to the reading operation by the second reading function.

As explained above, in the first embodiment, the operator can perform the work for removing articles having an expired freshness date by moving around the target area. Therefore, the operator can perform the work in a short time.

Second Embodiment

Figure 9A:
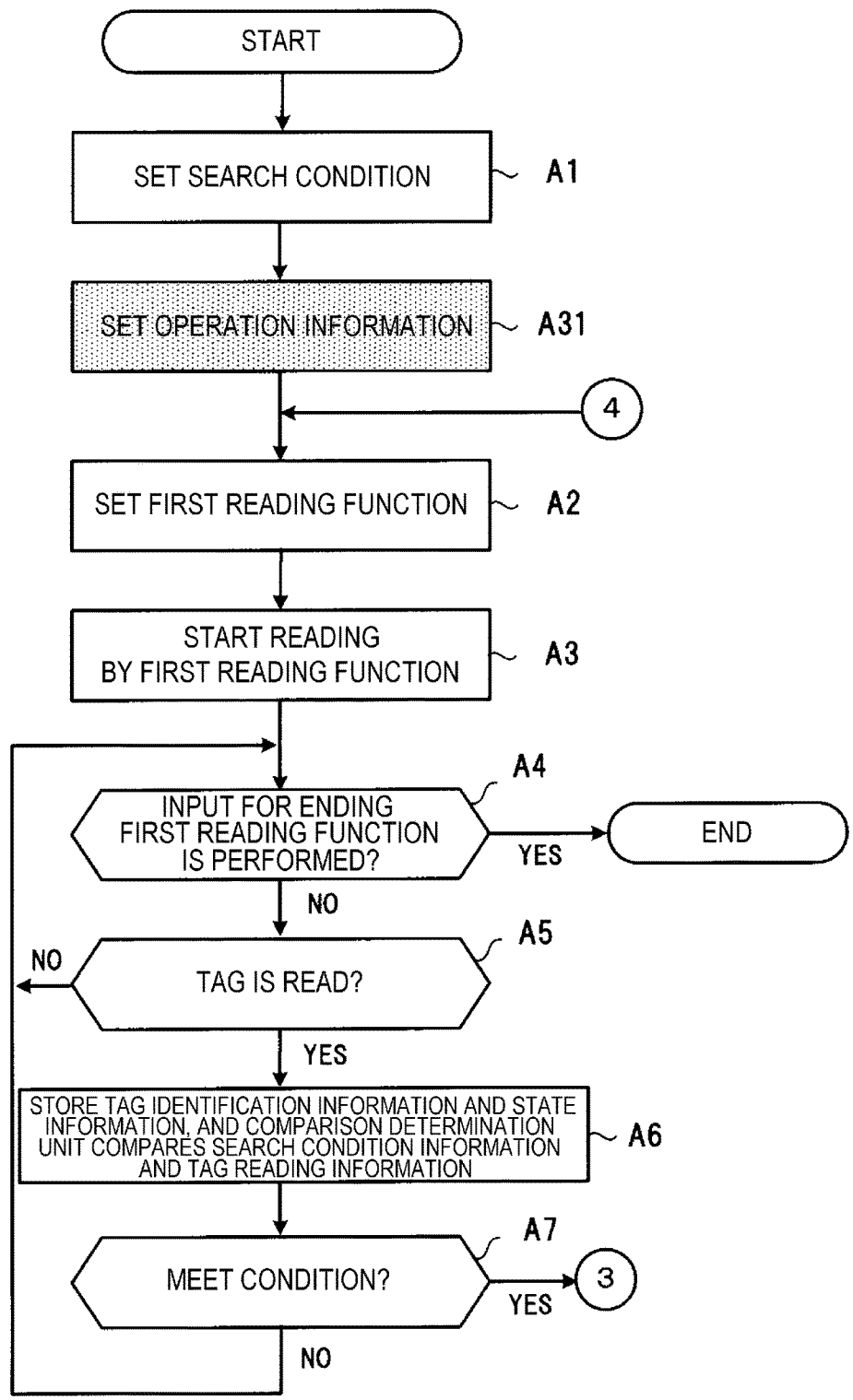
FIG. 9A is a flowchart for explaining a processing procedure of a control unit in a second embodiment.
Figure 9B:
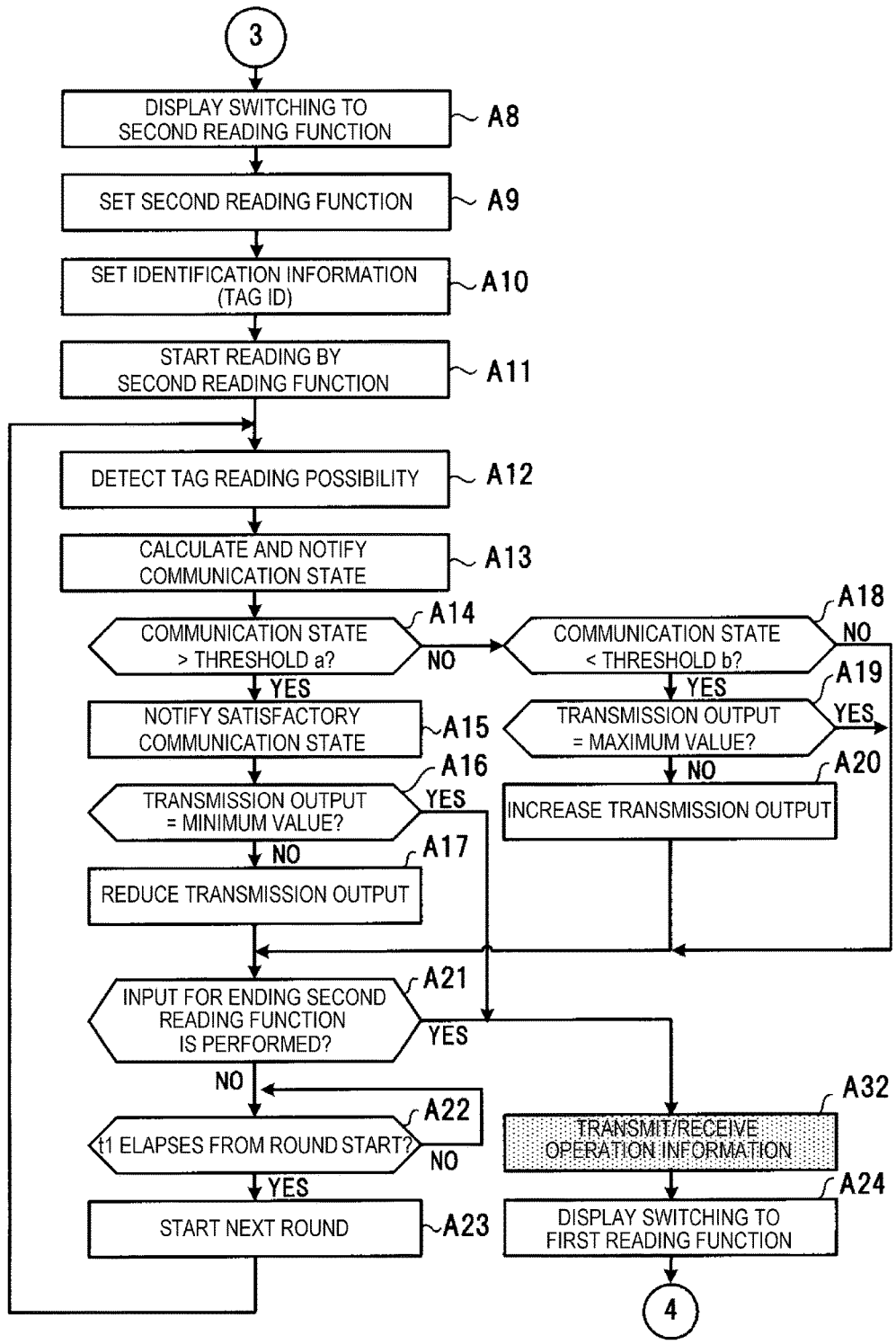
FIG. 9B is a flowchart for explaining the processing procedure of the control unit following FIG. 9A.

A radio tag communication apparatus according to a second embodiment is explained with reference to FIGS. 9A, 9B, and 10. FIGS. 9A and 9B are flowcharts for explaining a processing procedure performed by the control unit 33 when search work by the communication apparatus 20 is performed in the second embodiment. Acts common to the processing procedure shown in FIGS. 5A and 5B in the first embodiment are denoted by the same reference signs.

In the second embodiment, the control unit 33 performs setting of operation information (Act A31) following Act A1 for setting a search condition in FIG. 9A. Further, when the reading operation by the second reading function ends in Act A21 in FIG. 9B, the control unit 33 transmits or receives the operation information set in Act A31 and writes information concerning a search history in or reads the information from a target radio tag (Act A32).

In FIG. 9A, after setting the search condition in Act A1, subsequently, the control unit 33 displays a screen shown in FIG. 10 in Act A31 and stores information input by the operation-information setting unit 252 in the storing unit 35 as the operation information 353.

FIG. 10 is an explanatory diagram showing an example of a setting input screen for operation information. In FIG. 10, items "1. Save a freshness date check date" and "2. Read a manufacturing date check date" can be selected and dates of the respective items can be input. The operator operates the keys of the input unit 25 to input dates to relevant input frames. In the example shown in FIG. 10, a date of "1. Save a freshness date check date" is input. When "3. Others" is pressed, the setting input screen transitions to a screen on which more detailed conditions can be set. Further, when "4. No setting information" is pressed, after a radio tag is searched and specified, information is not written in or read from a designated area of the storing unit 12 of the relevant radio tag 11.

In FIG. 9B, when the present transmission output of the communication apparatus 20 is the same as the minimum value of the transmission output in the second reading function set in advance (Act A16) or when the key input for ending the second reading function is detected from the input unit 25 (Act A21), the control unit 33 ends the reading operation by the second reading function and transmits the operation information 353 (Act A32). When the operation information 353 instructs writing, the control unit 33 performs, according to the instruction, an operation for writing a freshness date check date, which is information concerning a search history, in a predetermined area of the storing unit 12 of the radio tag 11.

Figure 11A:
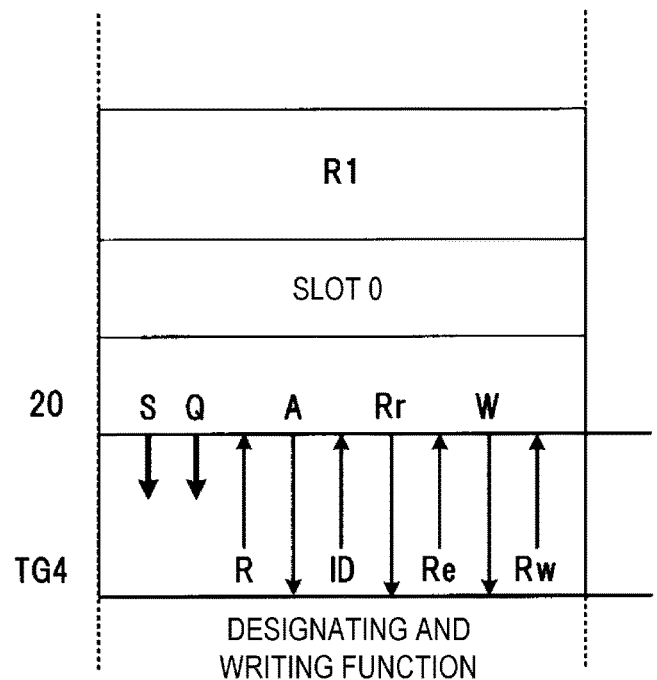
FIG. 11A is a timing chart of a radio communication protocol for a designating and writing function in the second embodiment.

At this point, in order to prevent the freshness date check date from being written in a radio tag other than the target radio tag, the control unit 33 writes the freshness date check date using a designating and writing function shown in FIG. 11A. Further, in order to prevent occurrence of a writing error, the control unit 33 sets a transmission output larger than the minimum value of the transmission output in the second reading function and writes the freshness date check date. That is, in order to rewrite content of the storing unit 12 of the radio tag 11, the writing operation requires electric power larger than the electric power of the reading operation. The control unit 33 sets a transmission output larger than the minimum value of the transmission output in the second reading function and supplies sufficient electric power to the radio tag 11 to thereby suppress occurrence of a writing error.

FIG. 11A is a timing chart showing an example of a radio communication protocol between the communication apparatus 20 and the radio tag 11 in the second embodiment. As in FIGS. 7 and 8, in this example, the radio communication protocol conforms to the protocol of ISO18000-6 type C. The number of slots per one round is set to "1".

All signs [S], [Q], [R], [A], [ID], [Rr], [Re], [W], and [Rw] indicate communication data. Preamble codes indicating the top of data are included in the tops of the communication data. Error detection codes such as CRC (Cyclic Redundancy Check) codes are included in the communication data excluding [S]. A reception side can detect an error.

First, the communication apparatus 20 transmits the Select command [S] in which identification information of a target radio tag is set. Thereafter, as in FIG. 7, the communication apparatus 20 performs communication and, upon receiving the Reply information [Re] without an error, transmits a Write command [W] including top address information in which the freshness date check date is stored in the storing unit 12 of the radio tag 11 and data information of the freshness date check date of the operation information 353, and waits for Reply information [Rw] to the Write command. Upon receiving the Reply information [Rw], the communication apparatus 20 detects presence or absence of an error and, when there is no error, performs designating and writing. When an error is detected, the communication apparatus 20 retries the writing operation by the designating and writing function. After the end of the designating and writing, the communication apparatus 20 displays to the effect that the reading operation by the second reading function is switched to the reading operation by the first reading function (Act A24) and returns to Act A2 in FIG. 9A.

Even in the state in which the operator does not acquire information concerning a search ID list in advance, if the operator moves around the target area (Area), the operator can specify an article having an expired freshness date and write the freshness date check date in a predetermined area of the storing unit 12 of the radio tag 11 included in the article. Therefore, the operator can perform the work in a short time.

As the information concerning the search history written in the storing unit 12 of the radio tag 11, besides the freshness date check date, information concerning a manufacturing date check date can also be written. Since the freshness date check date, the manufacturing date check date, or the like is written in the radio tag 11, it is possible to grasp a search history in the past. When an article having an expired freshness date or expiration date for use is found, information such as "cannot be sold" or "cannot be used" may be written.

Third Embodiment

A radio tag communication apparatus according to a third embodiment is explained with reference to FIGS. 9A, 9B, and 11B.

The third embodiment relates to processing performed when "2. Read a manufacturing date check date" in FIG. 10 is selected in the setting of operation information (Act A31) in FIG. 9A. For example, information concerning a search history is acquired in order to learn when a check (reading) of a manufacturing date is performed so far concerning an article having an expired freshness date.

In FIG. 9B, when the present transmission output of the communication apparatus 20 is the same as the minimum value of the transmission output in the second reading function set in advance (Act A16) or when the key input for ending the second reading function is detected from the input unit 25 (Act A21), the control unit 33 ends the reading operation by the second reading function and receives the operation information 353. When the operation information 353 instructs reading, the control unit 33 reads, according to the instruction, a manufacturing date check date, which is information concerning a search history, from a predetermined area of the storing unit 12 of the radio tag 11 (Act A32).

Figure 11B:
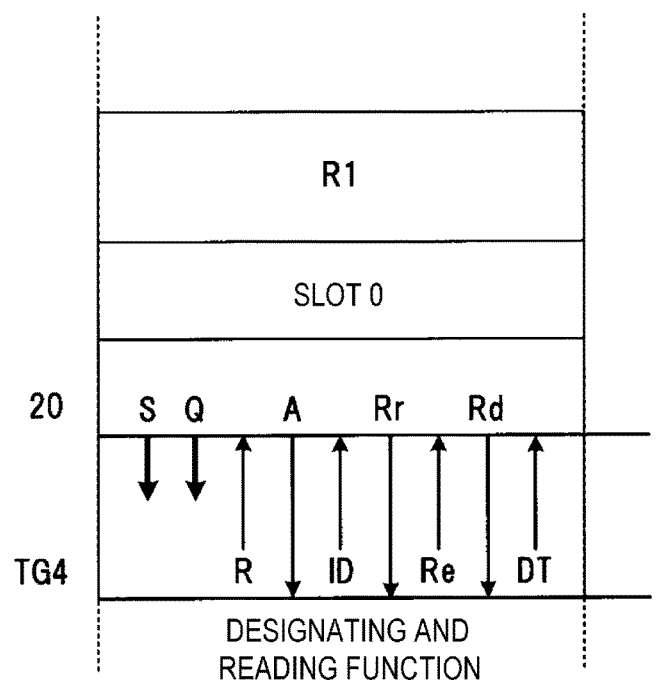
FIG. 11B is a timing chart of a radio communication protocol for a designating and reading function in a third embodiment.

At this point, in order to prevent the manufacturing date check date from being read from a radio tag other than the target radio tag, the control unit 33 reads the manufacturing date check date using a designating and reading function shown in FIG. 11B. Further, in order to prevent occurrence of a reading error, the control unit 33 sets a transmission output smaller than the minimum value of the transmission output in the second reading function and reads the manufacturing date check date.

That is, as explained above, the second reading function reduces the transmission output to the minimum value in order to finally narrow down a presence range of articles having an expired freshness date. When the transmission output is small, a reading error tends to occur because of a positional relation between an article and the communication apparatus 20. However, when the manufacturing date check date is read in the third embodiment, identification information of the target radio tag is known. Therefore, by using the designating and reading function, even if the transmission output is set smaller than the minimum value of the second reading function, it is possible to read the manufacturing date check date. Therefore, it is possible to prevent a radio tag other than the target tag from being read. Further, it is possible to prevent occurrence of a reading error.

FIG. 11B is a timing chart showing an example of a radio communication protocol between the communication apparatus 20 and the radio tag 11 in the third embodiment. As in FIGS. 7, 8, and 11A, in this example, the radio communication protocol conforms to the protocol of ISO18000-6 type C. The number of slots per one round is set to "1".

All signs [S], [Q], [R], [A], [ID], [Rr], [Re], [Rd], and [DT] indicate communication data. Preamble codes indicating the top of data are included in the tops of the communication data. Error detection codes such as CRC (Cyclic Redundancy Check) codes are included in the communication data excluding [S]. A reception side can detect an error.

First, the communication apparatus 20 transmits the Select command [S] in which identification information of a target radio tag is set. Thereafter, as in FIG. 7, the communication apparatus 20 performs communication and, upon receiving the Reply information [Re] without an error, transmits a Read command [Rd] including top address information of a manufacturing date check date in the storing unit 12 of the radio tag 11 and data information of the manufacturing date check date, and waits for information [DT] including information concerning the manufacturing date check date. Upon receiving the information [DT], the communication apparatus 20 detects presence or absence of an error and, when there is no error, ends the designating and reading function. When an error is detected, the communication apparatus 20 retries the reading operation by the designating and reading function. After the end of the designation and reading, the communication apparatus 20 displays to the effect that the reading operation by the second reading function is switched to the reading operation by the first reading function (Act A24), returns to Act A2 in FIG. 9A, and performs the reading operation by the first reading function.

Consequently, even in the state in which the operator does not acquire information concerning a search ID list in advance, if the operator moves around the target area (Area), the operator can specify an article having an expired freshness date and perform, in a short time, work for reading a manufacturing date check date from a predetermined area of the storing unit 12 of the radio tag 11 included in the article. In the reading of the radio tag 11 from the storing unit 12, besides the manufacturing date check date, information concerning a search history such as a freshness date check date can be read. By reading the information concerning the manufacturing date check date, the freshness date check date, or the like from the radio tag 11, it is possible to grasp a search history in the past.

Fourth Embodiment

A radio tag communication system according to a fourth embodiment is explained with reference to FIG. 12.

Figure 12:
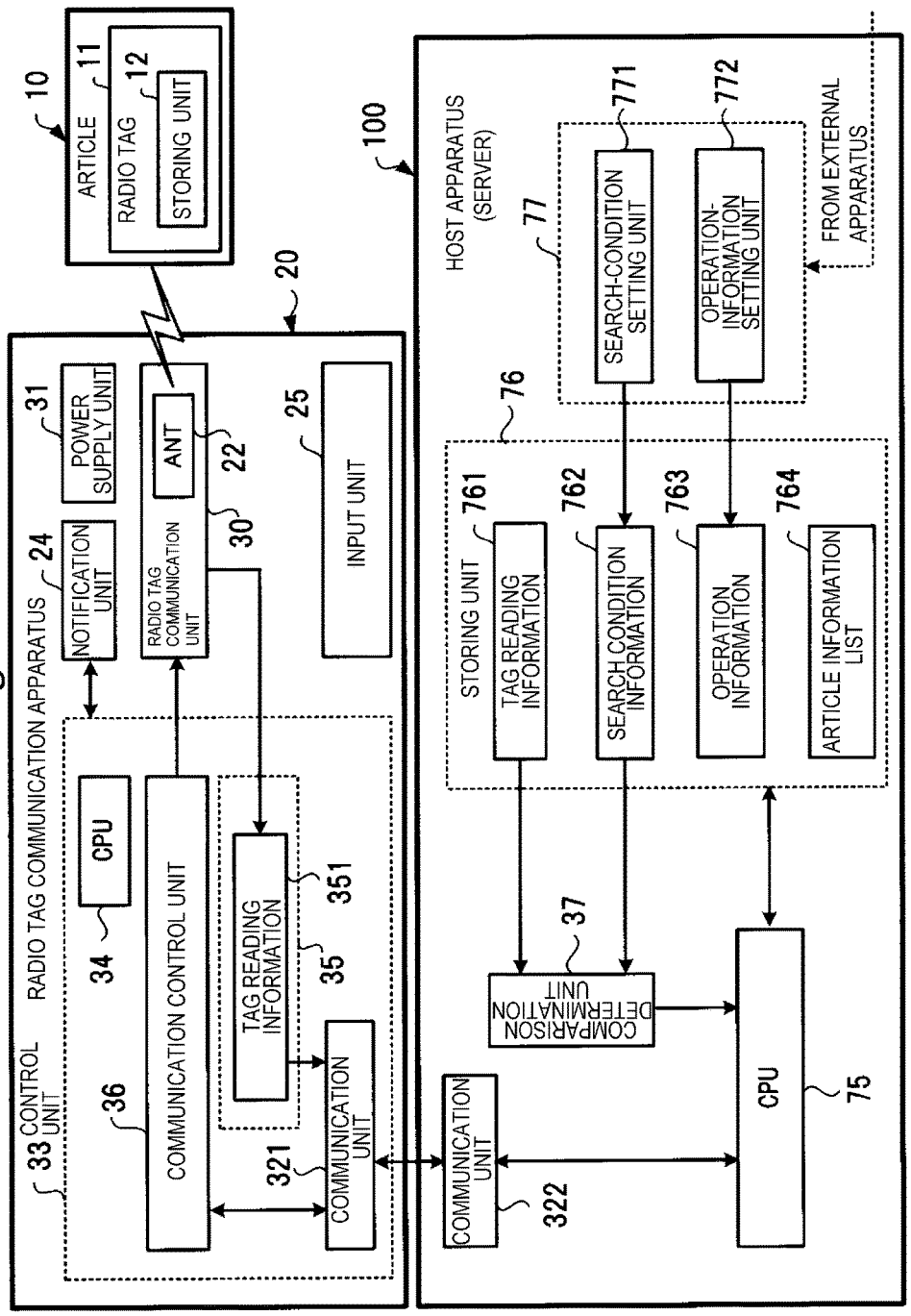
FIG. 12 is a block diagram showing the configuration of a radio tag communication system according to a fourth embodiment.

FIG. 12 is a block diagram of the radio tag communication system according to the fourth embodiment. The radio tag communication system includes the radio tag communication apparatus 20 and the host apparatus (the server) 100. Components functionally the same as the components shown in FIG. 3 are denoted by the same reference numerals. In the following explanation, the radio tag communication apparatus 20 is referred to as communication apparatus 20.

The communication apparatus 20 includes the notification unit 24, the input unit 25, the radio tag communication unit 30, the power supply unit 31, a communication unit 321 for communication with the host apparatus, and the control unit 33. The control unit 33 includes the CPU 34, the storing unit 35, and the communication control unit 36.

The notification unit 24 includes a display and a buzzer. The input unit 25 includes a keyboard and a touch, panel configured on the display of the notification unit 24. The power supply unit 31 includes a battery and a control circuit configured to charge and discharge the battery. The communication unit 321 manages communication with the host apparatus 100 connected to the communication unit 321 via a communication line. The communication line may be either wired or wireless.

The control unit 33 controls the input unit 25, the notification unit 24, the radio tag communication unit 30, and the power supply unit 31 under the control by the CPU 34. The communication control unit 36 includes a function setting unit and sets one of the first reading function and the second reading function.

The host apparatus 100 includes a communication unit 322, the comparison determination unit 37, a CPU 75, a storing unit 76, and an input unit 77. The communication unit 322 performs communication with the communication apparatus 20. The comparison determination unit 37 performs comparison determination of tag reading information 761 and search condition information 762 stored in the storing unit 76. The CPU 75 controls the operation of the entire host apparatus 100.

In the storing unit 76, the tag reading information 761 (equivalent to the tag reading information 351) transmitted from the communication apparatus 20, the search condition information 762 set by a search-condition setting unit 771 of the input unit 77, operation information 763 set by an operation-information setting unit 772, and an article information list 764 are stored.

The communication unit 321 of the communication apparatus 20 and the communication unit 322 of the host apparatus 100 communicate information to each other. The communication apparatus 20 transmits information read from the radio tag 11 to the host apparatus 100 and receives a comparison determination result of tag reading information and search condition information from the host apparatus 100. The communication control unit 36 performs switching of the first reading function and the second reading function in response to the setting of the first reading function and the second reading function and the received comparison determination result.

There is a method in which the search-condition setting unit 771 and the operation-information setting unit 772 set a search condition and operation information according to inputs from the input unit 77 provided in the host apparatus 100. However, the search-condition setting unit 771 and the operation-information setting unit 772 can also be configured to receive information input from an external apparatus (not shown in the figure) and set a search condition and operation information.

In the article information list 764 of the storing unit 76, article information not only in the target area (Area) shown in FIG. 1 but also in all other areas is stored. It is assumed that, although articles having an expired freshness date present in all the areas can be extracted, articles having an expired freshness date present in the target area (Area) shown in FIG. 1 cannot be extracted. That is, it is assumed that individual item management of present articles is not performed.

An operation and a processing procedure of the radio tag communication system shown in FIG. 12 are as explained with reference to FIGS. 5A and 5B or FIGS. 9A and 9B. In the radio tag communication system in the fourth embodiment, as in the radio tag communication system in the first embodiment or the second embodiment, even in a state in which the operator does not acquire information concerning a search ID list in advance, if the operator moves around the target area (Area), the operator can perform work for removing articles having an expired freshness date and an expired expiration date of use. Therefore, the operator can perform the work in a short time.

In the examples explained in the embodiments above, an article having an expired freshness date is searched for or a freshness date check date is written and a manufacturing date check date is read. However, information is not limited to these as long as the information can be stored in the storing unit 12 of the radio tag 11.

The server is explained as the example of the host apparatus 100. However, the host apparatus 100 can be configured by a notebook personal computer, a smart phone (a multifunction cellular phone), a tablet terminal, or the like other than the server.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A radio tag communication method including a radio tag communication unit that communicates with radio tags provided in a plurality of articles and including storing units capable of storing identification information and state information which is reference information in determining a present state of the article, comprising:
   setting a search condition used to check on a due date for reading the state information of a search target, from the storing unit of the radio tag;
   communicating with the radio tag under the set search condition using a first reading function for performing a reading operation without designating the radio tag, and a second reading function for designating the radio tag, setting a transmission output corresponding to a reading state of the designated radio tag, and repeatedly performing the reading operation;
   comparing and determining an information read from the radio tag by the first reading function and the set search condition; and
   controlling the radio tag communication unit according to a result of the comparing and determining to switch, when the radio tag communication unit reads state information meeting the set search condition from the radio tag using the first reading function, the reading operation by the first reading function to the reading operation by the second reading function.

2. The method according to claim 1 further comprising:
   setting a writing or reading of information concerning a search history of the radio tag by an operation-information setting unit; and
   controlling writes the information concerning the search history in a designated area of the storing unit of the radio tag after an end of the reading operation by the second reading function according to the setting of the operation-information setting unit, and controlling the written information concerning the search history to be readable.

3. The method according to claim 2, wherein the radio tag communication unit having a designating and reading function for designating the radio tag and reading the information concerning the search history; and performing a reading operation for the information concerning the search history written in the radio tag with the designating and reading function, after the end of the reading operation by the second reading function.

4. The method according to claim 3, wherein, switching the reading operation by the second reading function to the reading operation by the first reading function, after the end of the reading operation by the second reading function of the radio tag communication unit and an end of the reading operation by the designating and reading function.

5. A radio tag communication apparatus that communicates with radio tags provided in a plurality of articles and including storing units capable of storing identification information and state information which is reference information in determining a present state of the article, the radio tag communication apparatus comprising:

a search-condition setting unit configured to set a search condition used to check on a due date for reading the state information of a search target, from the storing unit of the radio tag;

an operation-information setting unit capable of setting a writing of information concerning a search history of the radio tag;

a radio tag communication unit configured to perform communication with the radio tag under the set search condition using a first reading function for performing a reading operation without designating the radio tag and a second reading function for designating the radio tag, setting a transmission output corresponding to a reading state of the designated radio tag, and repeatedly performing the reading operation;

a comparison determination unit configured to perform comparison determination of information read from the radio tag by the first reading function and the set search condition; and a communication control unit configured to control the radio tag communication unit according to a result of the comparison determination to switch, when the radio tag communication unit reads state information meeting the set search condition from the radio tag using the first reading function, the reading operation by the first reading function to the reading operation by the second reading function, and writes the information concerning the search history in a designated area of the storing unit of the radio tag after an end of the reading operation by the second reading function according to the setting of the operation-information setting unit.

6. The apparatus according to claim 5, the operation-information setting unit capable of setting a reading of information concerning a search history of the radio tag, wherein the radio tag communication unit has a designating and reading function for designating the radio tag and reading the information concerning the search history, and the communication control unit according to the setting of the operation-information setting unit, after the end of the reading operation by the second reading function, performs, with the designating and reading function, a reading operation for the information concerning the search history written in the radio tag.

7. The apparatus according to claim 5, wherein after the end of the reading operation by the second reading function of the radio tag communication unit and an end of the reading operation by the designating and reading function, the communication control unit switches the reading operation by the second reading function to the reading operation by the first reading function.

* * * * *